United States Patent [19]
Yoshida et al.

[11] Patent Number: 5,208,687
[45] Date of Patent: May 4, 1993

[54] LIQUID CRYSTAL DISPLAY DEVICE HAVING A LIQUID CRYSTAL CAPSULES DISPERSED IN THE FIRST LIQUID CRYSTAL AND INCLUDING THEREIN A SECOND LIQUID CRYSTAL

[75] Inventors: Hidefumi Yoshida; Kazutaka Hanaoka; Kimiaki Nakamura; Makoto Ohashi, all of Kawasaki, Japan

[73] Assignee: Fujitsu Limited, Kawasaki, Japan

[21] Appl. No.: 849,338

[22] Filed: Mar. 11, 1992

[30] Foreign Application Priority Data

Mar. 12, 1991 [JP] Japan .................................. 3-045306
Feb. 12, 1992 [JP] Japan .................................. 4-25117

[51] Int. Cl.⁵ .............................................. G02F 1/13
[52] U.S. Cl. ........................................ 359/51; 359/52; 359/63; 359/86
[58] Field of Search ................. 359/51, 52, 63, 73, 359/86, 94, 99

[56] References Cited

U.S. PATENT DOCUMENTS 4,685,771 8/1987 West et al. ............................ 359/51
4,688,901 8/1987 Albert .................................... 359/52
5,076,668 12/1991 Dalisa et al. .......................... 359/51
5,093,735 3/1992 Doane et al. ......................... 359/52

OTHER PUBLICATIONS

Wu et al, "Angular discrimination of light transmission through polymer dispersed liquid crystal films" J. Appl. Phys. vol. 62, No. 9, Nov. 1987.

*Primary Examiner*—William L. Sikes
*Assistant Examiner*—Huy K. Mai
*Attorney, Agent, or Firm*—Staas & Halsey

[57] ABSTRACT

A liquid crystal device including a liquid crystal layer comprising a liquid crystal of a dispersed type in which molecules of the liquid crystal are randomly distributed. The liquid crystal layer (14) includes a first liquid crystal (16) existing between the orientation layers of the first and second transparent plates and liquid crystal capsules (20) dispersed in the first liquid crystal and including therein a second liquid crystal (18), for preventing light leaking. Also, the liquid crystal panel has a scattering value greater than 1 percent, where the scattering value is defined by a percentage of a ratio of an intensity of light transmitted by the liquid crystal panel to that of the source of the laser beam without a liquid crystal.

9 Claims, 10 Drawing Sheets

LIQUID CRYSTAL DISPLAY DEVICE HAVING A LIQUID CRYSTAL CAPSULES DISPERSED IN THE FIRST LIQUID CRYSTAL AND INCLUDING THEREIN A SECOND LIQUID CRYSTAL

BACKGROUND OF THE INVENTION

1. Field of the Invention

The present invention relates to a liquid crystal display device including a dispersed type liquid crystal in which molecules of the liquid crystal are randomly distributed so that an incident light impinges on the molecules of the liquid crystal to scatter.

2. Description of the Related Art

Recently, liquid crystal display devices are applied to a variety of technical fields and the requirements for improving display quality, such as a large display surface, a high definition, and color display. Several types of liquid crystals are utilized in liquid crystal display devices. Twisted nemeatic liquid crystals have often been used, and in this case, molecules of the liquid crystal oriented in a constant direction relative to the transparent plates between which the liquid crystal is inserted. Alternatively, a liquid crystal of a dispersed type, such as a polymer dispersed liquid crystal has been developed and in this case, molecules of the liquid crystal are randomly distributed so that an incident light impinges on the molecules of the liquid crystal to scatter.

For example, FIG. 6 of the attached drawings shows a liquid crystal display device utilizing a twisted nematic liquid crystal. This liquid crystal display device includes a liquid crystal panel comprising a pair of opposed transparent plates 1 and 2, and a liquid crystal layer 3 sealignly inserted between the transparent plates 1 and 2. Electrodes and orientation layers (not shown) are provided on the inside surfaces of the transparent plates 1 and 2, respectively. The orientation layer of the upper transparent plate 1 is treated by rubbing in the direction, as shown by the arrow 1a, and the orientation layer of the lower transparent plate 2 is treated by rubbing in the direction, as shown by the arrow 2a. Accordingly, a portion of molecules of the liquid crystal near the upper transparent plate 1 oriented in the direction of the arrow 1a, and a portion of molecules of the liquid crystal near the lower transparent plate 1 oriented in the direction of the arrow 2a, with molecules of the liquid crystal between the upper and lower transparent plates 1 and 2 twisting by 90 degrees. An intermediate portion of molecules of the liquid crystal between the upper and lower transparent plates 1 and 2 is shown by the broken line 3a. Also, polarizers 4 and 5 are arranged, respectively, on the outside of the upper and lower transparent plates 1 and 2. The polarizers 4 and 5 have transmitting axes 4a and 5a of polarized light perpendicular to each other, in correspondence with the rubbing directions 1a and 1b of the upper and lower transparent plates 1 and 2.

In FIG. 6, the line Z—Z is a perpendicular line standing at the center of the display surface. When this liquid crystal display device is arranged in an upright position in a vertical plane, the line Z—Z is a horizontal center line across the display surface and the line X—X is a vertical center line. In such a twisted nematic liquid crystal display device, a visual angular characteristic appears depending on a relationship between an angle by which a user sees the display and an orientation of the intermediate molecules 3a of the liquid crystal between the upper and lower transparent plates 1 and 2. In FIG. 6, the character $\theta$ shows a visual angle of depression and the character $\phi$ is a visual rotating angle. A user sees the liquid crystal display device from the front thereof when $\theta$ is zero, and sees the liquid crystal display device obliquely when $\theta$ is not zero. In the latter case, a user sees the upright liquid crystal display device from an upper position when $\phi$ is 90 degrees and sees the upright liquid crystal display device from a lower position when $\phi$ is 270 degrees.

FIGS. 7A to 7C show the twisted nematic liquid crystal display device to which lights are incident in the different directions A, B, and C. The arrow C shows a light incident perpendicular to the liquid crystal panel and the arrows A and B show lights incident obliquely to the liquid crystal panel. Also, FIG. 7A shows the liquid crystal display device when the applied voltage V is zero, FIG. 7B shows the liquid crystal display device when the applied voltage V is $V_S$ which is a relatively small value, and FIG. 7C shows the liquid crystal display device when the applied voltage V is $V_L$ which is a relatively large value. In the twisted nematic liquid crystal display device, an incident polarized light rotates 90 degrees in accordance with the twist of the liquid crystal, and the plane of vibration of the transmitting polarized light rotates 90 degrees relative to the plane of vibration of the incident polarized light. Accordingly, the polarized light transmitting the polarizer 5 (FIG. 6) can transmit the analyzer 4 by rotating 90 degrees. Also, as shown in FIGS. 7B and 7C, molecules 3a of the liquid crystal rise as the applied voltage increases, so that an angle between the direction of the long axis of the molecules of the liquid crystal and the direction of the propagation of the light changes, causing a change in an optical effect of birefringence so that an intensity of transmitting light decreases. The optical effect of birefringence varies for the lights A, B, and C. For example, regarding the light C perpendicular to the liquid crystal panel, the optical effect by birefringence is "large" in FIG. 7A, "medium" in FIG. 7B, and "small" in FIG. 7C, with the intensity of the transmitting light decreasing in this order. Regarding the light A obliquely extending in the same sense as the tilt of the intermediate molecules 3a of the liquid crystal, the optical effect by birefringence is "medium" in FIG. 7A, "small" in FIG. 7B, and again "medium" in FIG. 7C. Also Regarding the light B obliquely extending in the opposite sense to the tilt of the intermediate molecules 3a of the liquid crystal, the optical effect by birefringence is "medium" in FIG. 7A, "large" in FIG. 7B, and again "medium" in FIG. 7C.

A visual angular characteristic of such a twisted nematic liquid crystal display device is typically summarized in FIG. 5. This visual angular characteristic is represented by a T-V relationship of a transmittance of a light through the liquid crystal 3 versus a voltage V applied to the liquid crystal 3. The curve F shows a visual angular characteristic when a user sees the liquid crystal panel from the front thereof, which corresponds to the case of the perpendicular incident light C of FIGS. 7A to 7C. The curve G shows a visual angular characteristic when a user sees the liquid crystal panel from a lower position, which corresponds to the case of the oblique incident light A of FIGS. 7A to 7C. The curve H shows a visual angular characteristic when a user sees the liquid crystal panel from an upper position, which corresponds to the case of the oblique incident light B of FIGS. 7A to 7C. In the visual angular characteristic G in the case of viewing the liquid crystal panel from a lower position, the transmitting light decreases with a slight increase of the voltage V and it is difficult to obtain a bright white display spot. Also, there is a portion M where brightness is reversed. Therefore, if a gradation display is attempted by controlling the voltage in correspondence with the brightness, a reversal of the resultant display brightness may result for example, a gray display spot may be produced at a position that is intended to produce a black display point, and reversely, a black display spot may be produced at a position that is intended to produce a gray display point. In reverse, in the visual angular characteristic H in the case of viewing the liquid crystal panel from an upper position, the reduction of the transmitting light is small even if the voltage V is increased to a greater value so that it is difficult to obtain a black display spot.

As described, there is the problem of a visual angular characteristic in the liquid crystal display device including an orderly oriented liquid crystal.

The liquid crystal display device including a liquid crystal of a dispersed type, such as a polymer dispersed liquid crystal, does not suffer from this problem in the twisted nematic liquid crystal display device because in the liquid crystal display device of a dispersed type, molecules of the liquid crystal are randomly distributed and the scattering of the incident light occurs in all directions, and accordingly a specific visual angular direction does not exist.

However, the dispersed type liquid crystal display device uses a medium in which the liquid crystal is dispersed. For example, in the polymer dispersed liquid crystal display device, the liquid crystal has the form of capsules that are dispersed in a polymer material. There is a problem of a leaking light in the dispersed liquid crystal display device, since the course of light is bent when the light propagates from the liquid crystal capsule to the polymer material, or vice versa, and the light may leak into adjacent display spots. If these adjacent display spots are black display spot, the leaking light graduates the quality of a black spot.

In addition, in the dispersed type liquid crystal display device it is desirable to produce a white display spot by scattering the impinging incident light when the voltage is not applied and produce a black display spot by causing molecules of the liquid crystal to rise relative to the transparent plates between which the liquid crystal is inserted when the voltage is not applied. However, there is a problem that, upon producing a white display spot by the scattering light, only a portion of the scattering light that has the same transmitting axis of polarized light as that of the polarizer on the light outlet side (analyzer) can transmit the latter and is utilized for producing a white display spot. But the remaining portion of the scattering light has a different transmitting axis of polarized light from that of the analyzer and thus cannot transmit the latter, and accordingly is not utilized. Therefore, the dispersed type liquid crystal display device suffers from a low utilization of light.

SUMMARY OF THE INVENTION

The object of the present invention is to provide a liquid crystal display device by which a visual angular characteristic is improved.

The another object of the present invention is to provide a liquid crystal display device by which the quality of display performance is improved.

The still another object of the present invention is to provide a liquid crystal display device by which a utilization of light is improved.

According to one aspect of the present invention, there is provided a liquid crystal device comprising a first transparent plate having transparent electrode means and an orientation layer, a second transparent plate having transparent electrode means and an orientation layer, a liquid crystal layer inserted between the first and second transparent plates, a first polarizer arranged on the outside of the first transparent plate, and a second polarizer arranged on the outside of the second transparent plate, wherein the liquid crystal layer includes a first liquid crystal existing between the orientation layer of the first transparent plate and the orientation layer of the second transparent plate, and liquid crystal capsules dispersed in the first liquid crystal and including therein a second liquid crystal.

With this arrangement, the amount of the liquid crystal capsules including the second liquid crystal is greater than the amount of the first liquid crystal and the second liquid crystal mainly controls the displaying performance while the first liquid crystal acts as a medium for dispersing therein the liquid crystal capsules. The second liquid crystal scatters an incident light to produce a white display spot when the voltage is not applied and rises relative to the first and second transparent plates when the voltage is applied to produce a black display spot. The first liquid crystal is preferably oriented perpendicular to the first and second transparent plates, and the first and second liquid crystal are deemed to be uniformly distributed, so that the course of light is not substantially bent when the light propagates from the first liquid crystal to the second liquid crystal, and vice versa and a leakage of light may not occur.

According to another aspect of the present invention, there is provided a liquid crystal device comprising a liquid crystal panel including a first transparent plate having a transparent electrode means, a second transparent plate opposed to the first transparent plate with a small gap therebetween and having transparent electrode means, and a liquid crystal layer inserted between the first and second transparent plates, and first and second polarizer arranged, respectively, on the outside of the first and second transparent plates, wherein the liquid crystal layer comprises a liquid crystal of a dispersed type in which molecules of the liquid crystal are randomly distributed when the voltage is not applied to the liquid crystal so that an incident light impinges to the molecules of the liquid crystal to scatter the same and the molecules of the liquid crystal uniformly rise relative to the first and second transparent plates when the voltage is applied to the liquid crystal, and wherein the liquid crystal panel has a scattering value greater than 1 percent, where the scattering value is defined by a percentage of a ratio of an intensity of light transmitting the liquid crystal panel that is measured by arranging the liquid crystal panel between a laser beam source and a light detector in such an arrangement that the light detector receives divergent light from the liquid crystal panel within the angular range of approximately six degrees, to that measured by arranging the laser beam source and the light detector in the same arrangement without any liquid crystal.

With this arrangement, the liquid crystal scatters an incident light to produce a white display spot when the voltage is not applied and rises relative to the first and second transparent plates when the voltage is applied to produce a black display spot. Also, the liquid crystal panel is selected so that the scattering value of the liquid crystal panel is greater than 1 percent, where the scattering value is defined by a percentage of a ratio of an intensity of light measured by the light detector receiving divergent light within the angular range of approximately six degrees, to that measured without any liquid crystal. According to this feature of the present invention, it has been found that it is possible to increase the utilization of light.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
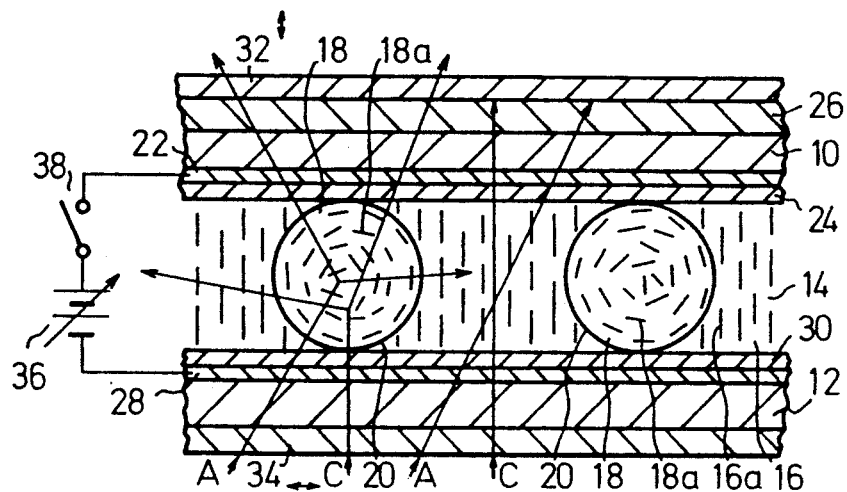
FIG. 1 is a cross-sectional view of a liquid crystal display device according to the first embodiment of the present invention.

FIG. 1 shows the liquid crystal display device according to the first embodiment of the present invention. The liquid crystal display device includes a liquid crystal panel comprising a first transparent plate 10, a second transparent plate 12 opposed to the first transparent plate 10 with a small gap therebetween, and a liquid crystal layer 14 inserted between the first and second transparent plates 10 and 12. The first transparent plate 10 has on the interior surface thereof a transparent electrode 22 and an orientation layer 24, and similarly, the second transparent plate 12 has on the interior surface thereof a transparent electrode 28 and an orientation layer 30. The orientation layers 24 and 30 comprises a polyimide resin but rubbing is not effected. The orientation layers 24 and 30 comprise preferably a perpendicular orientation layer by which molecules of the liquid crystal orient perpendicular to the first and second transparent plates 10 and 12. The transparent electrodes 22 and 28 comprise a layer of ITO ($In_2O_3$-$SnO_2$) and connected to a power source 36 via a switch 38. Although the transparent electrodes 22 and 28 and the switch 38 are shown in a simplified manner, it will be apparent that one of the transparent electrodes 22 is a common electrode and the other 28 comprises a plurality of picture electrodes provided at each small picture region. It is also known that such electrode 28 is driven by an active matrix drive.

First and second polarizers 32 and 34 are arranged, respectively, on the outside of the first and second transparent plates 10 and 12. One of the polarizers 32 and 34 is called an analyzer. The first and second polarizers 32 and 34 are arranged to have transmitting axes of polarized light in a perpendicular relationship to each other, as shown by the double headed arrows. In addition, a film 26 is arranged between the first transparent plate 10 and the first polarizer 32, the film 26 having anisotropic indices of refraction of a negative uniaxial type. The film 26 may be made from, for example, polyvinyl alcohol stretched in two dimensions (biaxial of multiaxial).

The liquid crystal layer 14 includes a first liquid crystal 16 existing between the first orientation layer 24 of the first transparent plate 10 and the second orientation layer 30 of the second transparent plate 12, and liquid crystal capsules 20 dispersed in the first liquid crystal 16 and including therein a second liquid crystal 18. The amount of the liquid crystal capsules 20 including the second liquid crystal 18 is greater than the amount of the first liquid crystal 16, and in the embodiment, the ratio of the amount of the second liquid crystal 18 to the amount of the first liquid crystal 16 is 9 to 1. Accordingly, the second liquid crystal 18 mainly controls the displaying performance while the first liquid crystal 16 acts as a medium for dispersing therein the liquid crystal capsules 20, like polymer material in a polymer dispersed liquid crystal display device.

The first liquid crystal 16 comprises a positive nematic liquid crystal in which a birefringence and a dielectric constant are positive (for example, $\Delta n=0.2$, $\Delta \epsilon=15$). Molecules 16a of the first liquid crystal 16 are oriented perpendicular to the first and second transparent plates 10 and 12 in a uniformly rising condition between the first orientation layer 24 of the first transparent plate 10 and the second orientation layer 30 of the second transparent plate 12 when the voltage is not applied, as shown in FIG. 1, and when the voltage is applied, as shown in FIG. 2.

The second liquid crystal 18 comprises the same positive nematic liquid crystal as the first liquid crystal 16. The nematic liquid crystal material is encapsulated in capsules of polymethyle methacrylate (PMMA) resin to form the liquid crystal capsules 20. The size of the liquid crystal capsules 20 is in the range from 1 to 20 microns. Molecules 18a of the second liquid crystal 18 are not affected by a specific orientation force and are randomly distributed in the liquid crystal capsules 20.

As shown in FIG. 1, when the voltage is not applied, obliquely incident polarized light A and perpendicularly incident polarized light C, which transmit the second polarizer 34 and are directed to the first liquid crystal 16, transmit the molecules 16a of the first liquid crystal 16 but are blocked by the first polarizer 32. Obliquely incident polarized light A and perpendicularly incident polarized light C, which are directed to the second liquid crystal 18, impinge on the molecules 18a of the second liquid crystal 18 and scatter. The scattering includes reflections, refractions and birefringences in the various directions, so that the scattering light includes various propagation courses and planes of vibrations of polarized light. A portion of this scattering light having the same plane of vibrations of polarized light as the transmitting axis of polarized light of the first polarizer 32 can transmit the first polarizer 32 to produce a white display spot. The remaining portion of the scattering light having the plane of vibrations of polarized light different from the transmitting axis of polarized light of the first polarizer 32 cannot transmit the first polarizer 32. The greater the rate of the second liquid crystal 18 to the first liquid crystal 16, the grater the useful scattering light and the lighter the white display.

Figure 2:
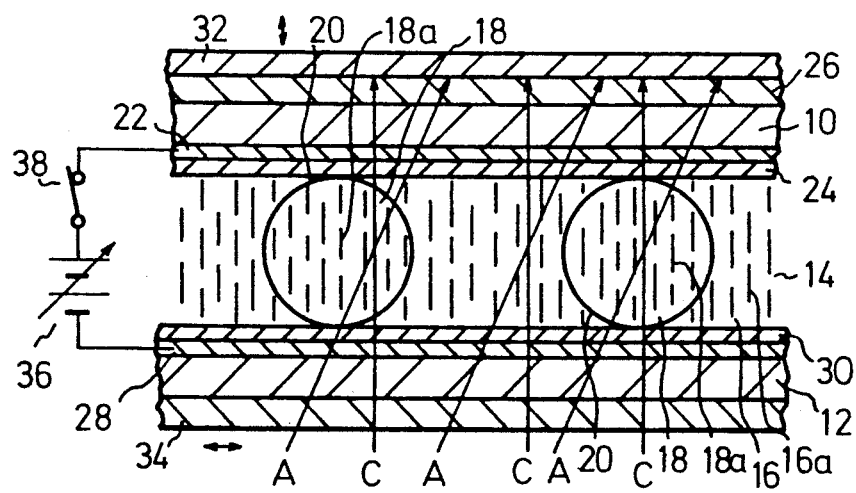
FIG. 2 is a cross-sectional view of the liquid crystal display device of FIG. 1 showing when the voltage is applied.

As shown in FIG. 2 the voltage is applied, and obliquely incident pollarized light A and perpendicularly incident polarized light C, which transmit the second polarizer 34, and are directed to the first liquid crystal 16, transmit the molecules 16a of the first liquid crystal 16 but are blocked by the first polarizer 32. The molecules 18a of the second liquid crystal 18 rise by the application of the voltage in a similar orientation to the molecules 16a of the first liquid crystal 16, and accordingly, obliquely incident polarized light A and perpendicularly incident polarized light C, which are directed to the second liquid crystal 18, transmit the molecules 18a of the second liquid crstal 18 but are blocked by the first polarizer 32. In this case, a black display spot is produced.

As described just above, obliquely incident polarized light A and perpendicular incident polarized light C, which are directed to the first liquid crystal 16 via the second polarizer 34, transmit the molecules 16a but are blocked by the first polarizer 32. Obliquely incident polarized light A is affected by an optical effect due to birefringence during propagating the molecules 16a of the first liquid crystal 16, and the plane of vibration of the polarized light A changes when it is emitted from the molecules 16a, resulting in a component of polarized light that can transmit the first polarizer 32. This component of polarized light that graduates the quality of a black spot and is disadvantageous.

The film 26 arranged between the first transparent plate 10 and the first polarizer 32 and having anisotropic indices of refraction of a negative uniaxial type, acts to prevent such a leaking light. This action is described with reference to FIGS. 3A to 3D.

Figure 3A:
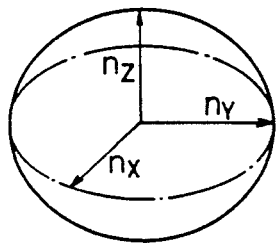
FIGS. 3A to 3D are view illustrating anisotropic indices of refraction of an inserted film and the liquid crystal.

FIG. 3A shows an ellipsoid of anisotropic indices of refraction of the film 26. Three axial indices of refraction $n_X$, $n_Y$ and $n_Z$ are shown, and in this case, a relationship of $n_X=n_Y>n_Z$ exists. FIG. 3B shows a cutting plane of this ellipsoid, which is cut perpendicular to the obliquely incident polarized light A. The optical effect of birefringence is characterized by the cutting plane of the ellipsoid of anisotropic indices of refraction, which becomes smaller from $n_1$ to $n_2$ as the angle between the optical axis and the obliquely incident polarized light A becomes greater.

Figure 3C:
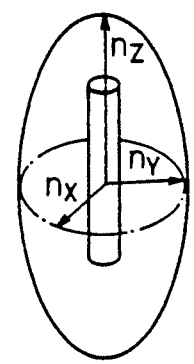
Figure 3B:
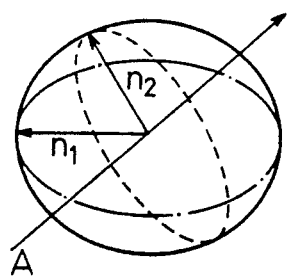
Figure 3D:
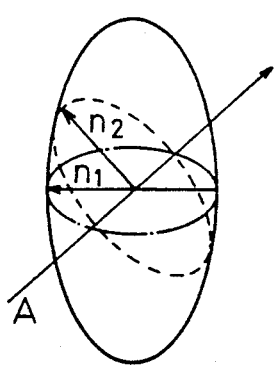

FIG. 3C shows an ellipsoid of anisotropic indices of refraction of a positive nematic liquid crystal. The positive nematic liquid crystal has three axial indices of refraction $n_X$, $n_Y$ and $n_Z$ in a relationship of $n_X=n_Y<n_Z$, like a positive uniaxial anisotropic crystal. FIG. 3d shows a cutting plane of this ellipsoid that is cut perpendicular to the obliquely incident polarized light A. The optical effect of birefringence becomes greater from $n_1$ to $n_2$ as the angle between the optical axis and the obliquely incident polarized light A becomes greater.

Therefore, the optical effect of birefringence of the obliquely incident polarized light A incident to the first liquid crystal 16 becomes greater as the incident angle of the obliquely incident polarized light A becomes greater, and the optical effect of birefringence of the film 26 that receives the previous polarized light becomes smaller as the incident angle of the obliquely incident polarized light A becomes greater. As a result, the plane of vibration of the polarized light A that transmits the second polarizer 34 changes during the transmission of the first liquid crystal 16, and the optical effect of birefringence of the film 26 acts to restore the plane of vibration of the polarized light toward that of the initial polarized light A. Accordingly, the polarized light A that transmits the film 26 does not transmit the first polarizer 32, and a leaking light is prevented.

Figure 4:
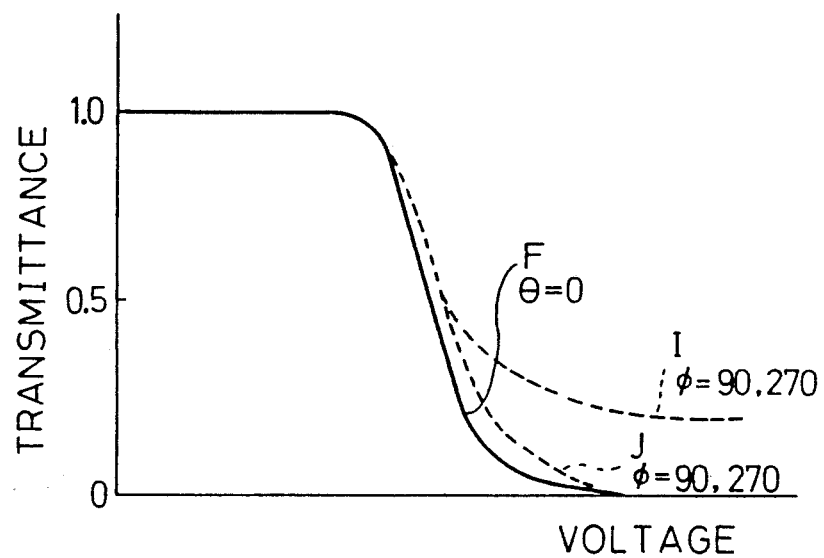
FIG. 4 is a view illustrating the transmittance versus the applied voltage of the device of FIG. 1.
Figure 5:
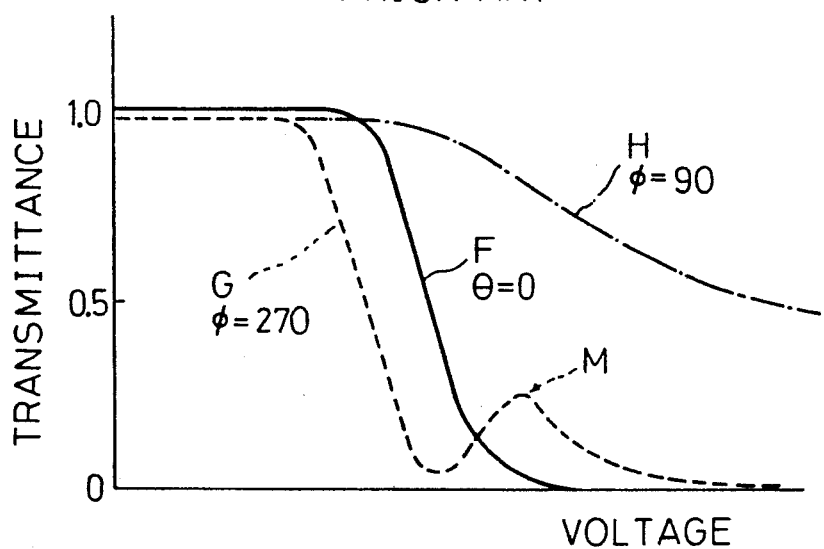
FIG. 5 is a view illustrating the transmittance versus the applied voltage of a conventional twisted nematic liquid crystal display device.
Figure 6:
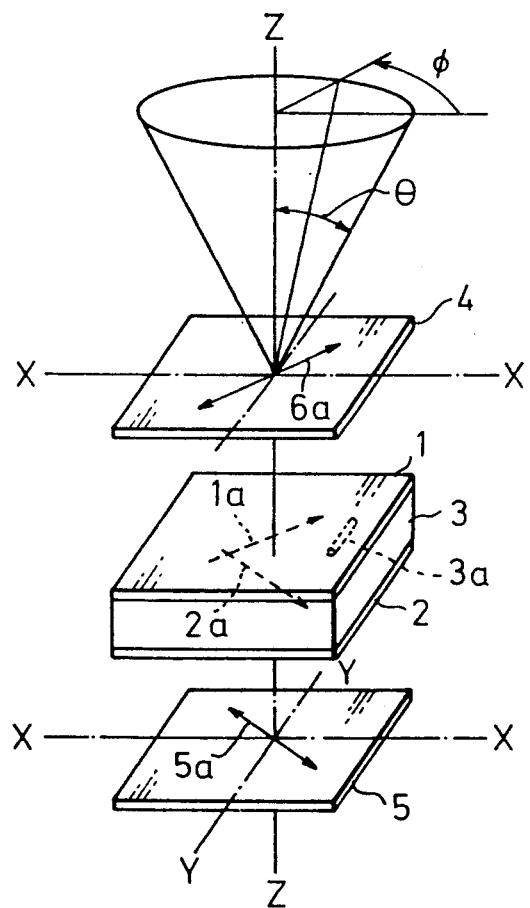
FIG. 6 is a view illustrating a conventional twisted nematic liquid crystal display device.
Figure 7A:
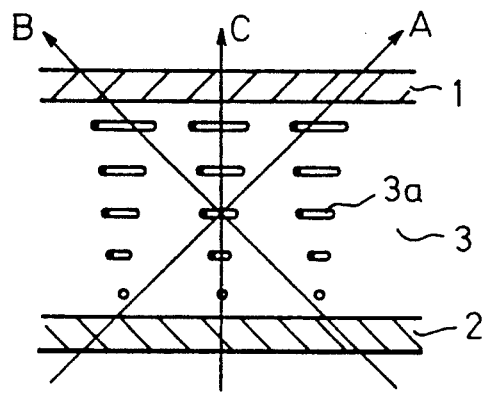
FIG. 7A to 7C are partial enlarged views of the device of FIG. 6 when the applied voltage is increased.
Figure 7B:
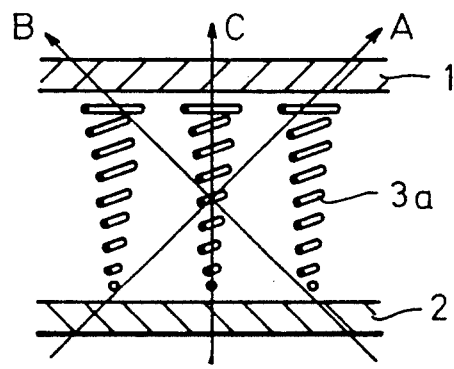
Figure 7C:
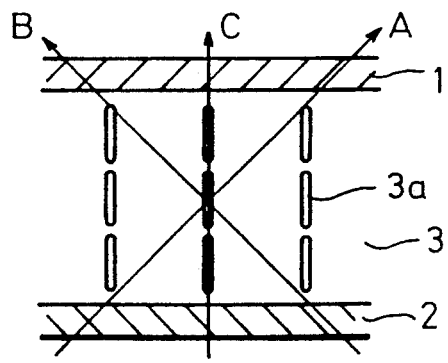

FIG. 4 shows a visual characteristic of the liquid crystal display device of FIG. 1. This visual characteristic is represented by a T-V relationship of a voltage V applied to the liquid crystal layer 14 and a transmission of the light through the liquid crystal layer 14. The characters $\theta$ and $\phi$ are the same as those defined with reference to FIG. 6. The curve F of FIG. 4 shows a visual characteristic when a user views the liquid crystal display device from the front thereof and similar to the curve F of FIG. 5. The curve I shows a visual characteristic when a user views the liquid crystal display device without the film 26 from a lower position or an upper position. It will be apparent that the curve I of FIG. 4 does not show a difference in the visual angular characteristics, which would have been shown by the curves G and H of FIG. 5 when a user views the liquid crystal display device from a lower position or an upper position. However, there is a leaking light in the case of the liquid crystal display device without the film 26, and the curve I has greater transmission in a region where the voltage is higher than that of the curve F. The curve J shows a visual characteristic when a user views the liquid crystal display device without the film 26 from a lower position or an upper position. The curve J shows a diminishing of a difference in the visual angular characteristic and prevents leaking light so that the curve J is close to the curve I.

Figure 8:
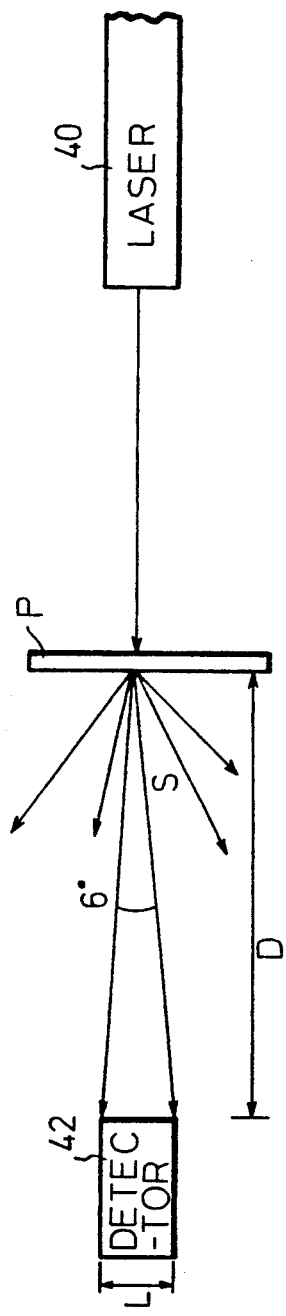
FIG. 8 is a view of admeasuring device for measuring a scattering value of a liquid crystal panel used in the second embodiment of the present invention.

FIG. 8 shows a measuring device for measuring a scattering value of the liquid crystal panel. The measuring device comprises a source of laser beam 40 and a light detector 42. The source of laser beam 40 uses a He-Ne laser. The light detector 42 can be a photometer or a photodiode having a known inlet opening. The measuring device can be used to measure a scattering value of the liquid crystal panel of FIG. 1 including the liquid crystal layer 14 with the second liquid crystal 18 dispersed in the first liquid crystal 16. This measuring device can also be used to measure a scattering value of the liquid crystal panel of the liquid crystal display device of a dispersed type of FIGS. 9, 13 or 15. The following description is an example of the measuring device applied to the liquid crystal display device of FIG. 9.

Figure 9:
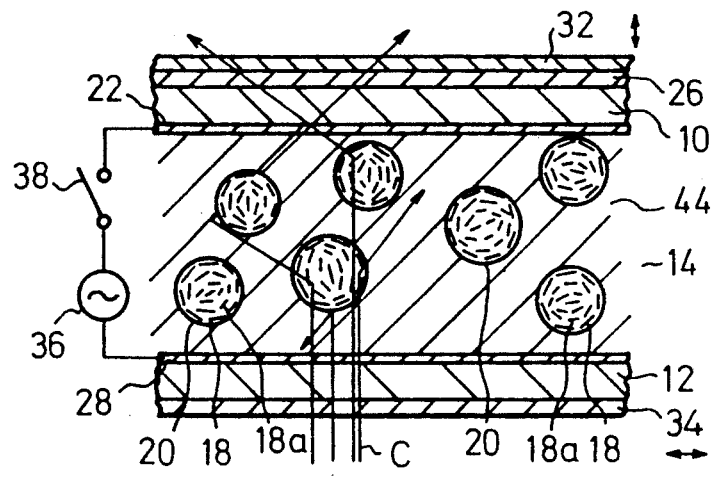
FIG. 9 is a view of a liquid crystal display device according to the second embodiment of the present invention.

FIG. 9 shows a polymer dispersed liquid crystal display device. The liquid crystal display device includes a liquid crystal panel comprising a first transparent plate 10, a second transparent plate 12 opposed to the first transparent plate 10 with a small gap therebetween, and a liquid crystal layer 14 inserted between the first and second transparent plates 10 and 12. The first and second transparent plates 10 and 12 have transparent electrodes 22 and 28 of ITO, respectively, which are connected to a power source 36 via a switch 38. One of the transparent electrodes 22 is a common electrode and the other 28 comprises a plurality of picture electrodes that can be driven by an active matrix drive. First and second polarizers 32 and 34 are arranged, respectively, on the outside of the liquid crystal panel. The first and second polarizers 32 and 34 are arranged to have transmitting axes of polarized light in a perpendicular relationship to each other, as shown by the double headed arrows. In addition, a film 26 is arranged between the first transparent plate 10 and the first polarizer 32, the film 26 having anisotropic indices of refraction of a negative uniaxial type. Such an arrangement will be similar to the embodiment of FIG. 1.

Figure 10:
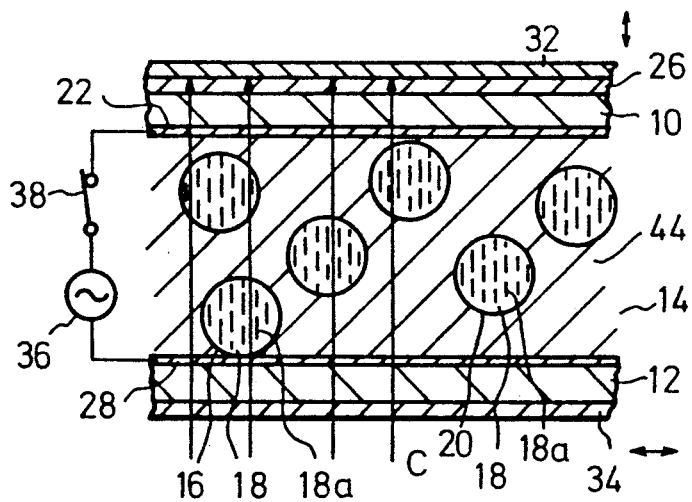
FIG. 10 is a cross-sectional view of the liquid crystal display device of FIG. 9, showing when the voltage is applied.

The liquid crystal layer 14 comprises a liquid crystal 18 dispersed in a polymer layer 44. The liquid crystal layer 14 can be obtained by mixing a positive nematic liquid crystal 18, in which a birefringence and a dielectric constant are positive, and a liquid polymer material to form the polymer layer 44, and by curing the polymer material by ultraviolet irradiation. Upon ultraviolet curing, the liquid crystal material becomes liquid crystal capsules 20 that disperse in the polymer layer 44. Alternatively, it is possible to obtain the liquid crystal capsules 20 by mixing a liquid crystal 18 in a polymer material containing a volatile component or an evaporative component by heating, and by hardening the polymer material by evaporation by drying or heating. Molecules 18a of the liquid crystal 18 are randomly distributed in the liquid crystal capsules 20 and act similarly to molecules 18a of the second liquid crystal 18 in the liquid crystal capsules 20 of FIG. 1. Namely, as shown in FIG. 9, when the voltage is not applied to the liquid crystal 18 an incident light impinges on the molecules 18a of the liquid crystal 18 to scatter the same to produce a white display spot. Also, as shown in FIG. 10, when the voltage is applied to the liquid crystal 18, molecules 18a of the liquid crystal 18 uniformly rise relative to the first and second transparent plates 10 and 12 in a uniformly rising condition to produce a black display spot.

In the liquid crystal panel having the liquid crystal layer 14 of a dispersed type, a portion of the scattering light can transmit the first polarizer 32 to produce a white display spot and the remaining portion of the scattering light is not utilized. Therefore, the liquid crystal panel having the liquid crystal layer 14 of a dispersed type has suffered from a low utilization of light. The present invention provides a liquid crystal display panel by which a utilization of light is improved.

In the present invention, a scattering value is defined by a value obtained from the measuring device of FIG. 8 comprising the source of laser beam 40 and the light detector 42.

In FIG. 8, the liquid crystal panel P having the liquid crystal layer 14 of a dispersed type is arranged between the source of laser beam 40 and the light detector 42 in a predetermined relationship. The liquid crystal panel P does not include the first and second polarizers 32 and 34 and the film 26. When the source of laser beam 40 emits the laser beam to the liquid crystal panel P, the laser beam transmitting the liquid crystal 18 impinges on molecules 18a of the liquid crystal 18 in the liquid crystal capsules 20 to scatter, and thus the scattering light S is emitted from the liquid crystal panel P. The scattering light S diverges in various directions depending on the extent of the scattering. The light detector 42 is arranged in such an arrangement that the light detector 42 receives the divergent light S from the liquid crystal panel P within the angular range of approximately six degrees. To achieve the angular range of approximately six degrees, for example, the distance D between the liquid crystal panel P and the light detector 42 is selected to 572 millimeters when the length L of the inlet opening of the light detector 42 is 6 millimeters. When other light detector 42 having the different length L of the inlet opening is used, it is possible to change the distance D between the liquid crystal panel P and the light detector 42 such that the light detector 42 receives the divergent light S from the liquid crystal panel P within the angular range of approximately six degrees.

In this way, an intensity of light T transmitting the liquid crystal panel P is measured. Then the liquid crystal panel P is removed from the measuring device, and an intensity of light LB of the source of laser beam 40 is measured by the measuring device comprising the source of laser beam 40 and the light detector 42 maintained in the same arrangement. In this case, there is no liquid crystal panel P or any liquid crystal between the source of laser beam 40 and the light detector 42. According to the present invention, the scattering value of the liquid crystal panel P is defined by a percentage of a ratio (T/LB) of an intensity of light T transmitting the liquid crystal panel P to the intensity of light LB of the source of laser beam 40 of any liquid crystal. The greater the thus defined scattering value, the closer the intensity of light T of the liquid crystal panel P to the intensity of light LB of the source of laser beam 40. This means that the extent of the scattering by the liquid crystal 18 is small. Also, the smaller the thus defined scattering value, the smaller the intensity of light T of the liquid crystal panel P than the intensity of light LB of the source of laser beam 40, meaning that the extent of the scattering by the liquid crystal 18 is great. That is, if the extent of the scattering is great, a portion of the scattering light that falls within the angular range of approximately six degrees becomes less.

To determine the optimum scattering value, five kinds of samples of liquid crystal panels P having various scattering values are prepared. The various scattering values are changed by changing the thickness of the liquid crystal layer 14, the content of the liquid crystal 18 and the size of the liquid crystal capsules 20. The scattering values are measured for these five kinds of samples of the liquid crystal panel P in accordance with the above described manner. Then, the first and second polarizers 32 and 34 and the film 26 are mounted to the liquid crystal panels P of the samples to make five kinds of the liquid crystal display devices of FIG. 9.

Figure 11:
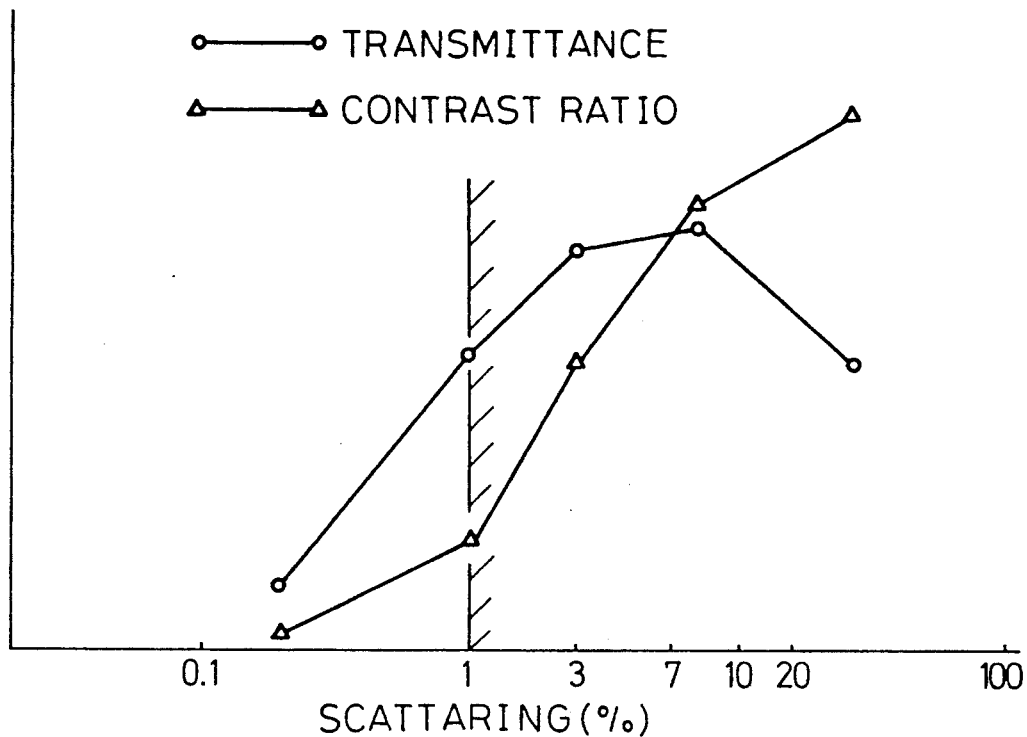
FIG. 11 is a view illustrating the transmittance and the contrast ration versus various scattering values of the liquid crystal panels for use in the embodiment of FIG. 9.

FIG. 11 shows an experimental result of measurement of the transmission and the contrast ratio versus the scattering value above defined, using the five kinds of the liquid crystal display devices of FIG. 9. As shown in the horizontal axis of FIG. 11, the above defined scattering of the five kinds of samples of the liquid crystal panels P are 0.5, 1.0, 5.0, 9.0, and 30. The transmission is a measure of a white display spot produced by the light transmitting the liquid crystal display device, and is plotted by a small circle-line curve. The contrast ratio is plotted by a triangle-line curve.

From the experimental result of FIG. 11, it has been found that the transmission through the liquid crystal display device has a peak so that the transmission increases to the peak as the scattering value increases and after the peak the transmission decreases as the scattering value increases. Also, it has been found that the contrast ratio continuously increases with the scattering value. In particular, the contrast ratio remarkably increases if the scattering value of the liquid crystal panel P exceeds 1 percent. Accordingly, both the transmission and the contrast ratio have respectively satisfactory levels if the scattering value is greater than 1 percent.

If the scattering value is greater than 3 percent, both the transmission and the contrast ratio have respectively satisfactory levels. More preferably, if the scattering value is within the range from 7 percents to 20 percents, the transmission is in the highest range and the contrast ratio is sufficiently high.

Figure 12:
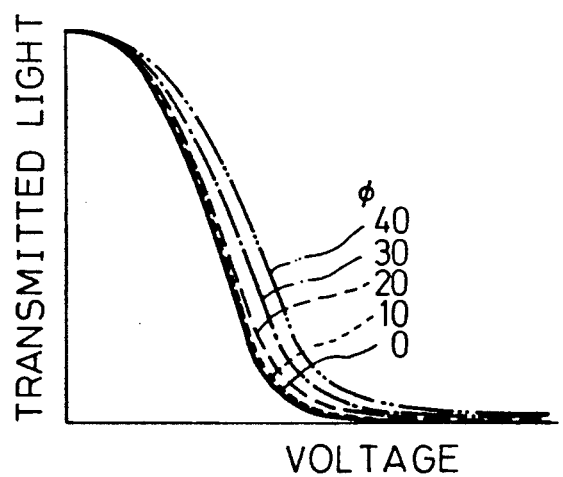
FIG. 12 is a view illustrating the transmittance versus the applied voltage of the embodiment of FIG. 9.

FIG. 12 shows a visual characteristic similar to that of FIG. 4. The variation in the transmission regarding the various visual rotating angle $\phi$ is small, and the display is substantially black when the applied voltage is 5 volts, for example. The T-V curves are smooth and it is adapted for a gradation display.

Figure 13:
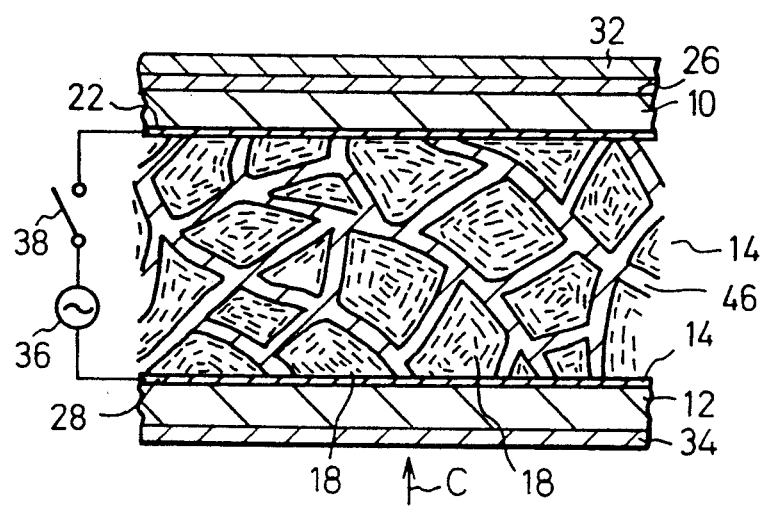
FIG. 13 is a view of a liquid crystal display device according to the third embodiment of the present invention.
Figure 14:
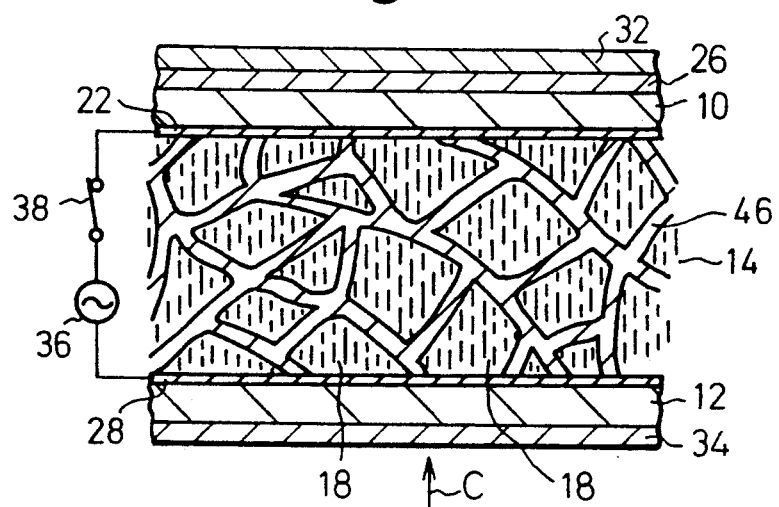
FIG. 14 is a cross-sectional view of the liquid crystal display device of FIG. 13, showing when the voltage is applied.

FIG. 13 shows a polymer network liquid crystal display device, and FIG. 14 shows the device of FIG. 13 when the voltage is applied. The liquid crystal display device includes a liquid crystal panel comprising a first transparent plate 10 with a small gap therebetween, and a liquid crystal layer 14 inserted between the first and second transparent plates 10 and 12. The first and second transparent plates 10 and 12 have transparent electrodes 22 and 28 of ITO, respectively, which are connected to a power source 36 via a switch 38. The first and second polarizers 32 and 34 are arranged to have transmitting axes of polarized light in a perpendicular relationship to each other. In addition, a film 26 is arranged between the first transparent plate 10 and the first polarizer 32, the film 26 having anisotropic indices of refraction of a negative uniaxial type.

The liquid crystal layer 14 comprises a liquid crystal 18 dispersed in a polymer layer 46 of a sponge-like network structure. The liquid crystal 18 is randomly distributed in the polymer layer 46. Therefore, when the voltage is not applied to the liquid crystal 18, an incident light impinges on the molecules of the liquid crystal 18 to scatter, and when the voltage is applied to the liquid crystal 18, the molecules of the liquid crystal 18 uniformly rise relative to the first and second transparent plates 10 and 12. This liquid crystal panel also has the scattering value satisfying the above description.

Figure 15:
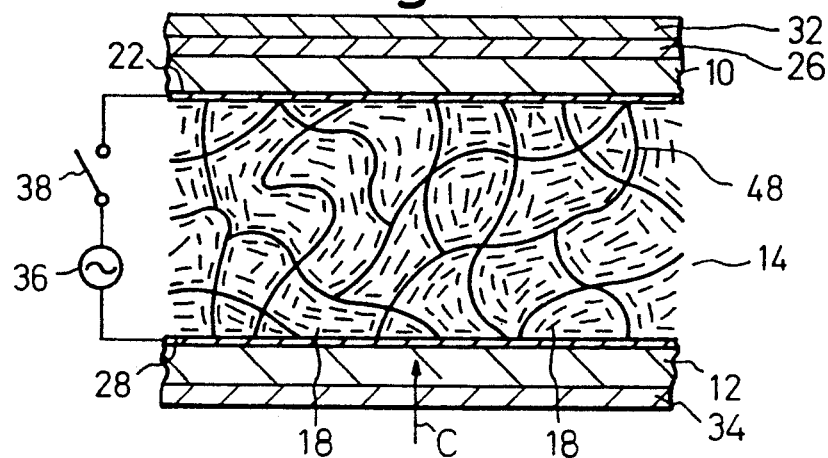
FIG. 15 is a view of a liquid crystal display device according to the fourth embodiment of the present invention.
Figure 16:
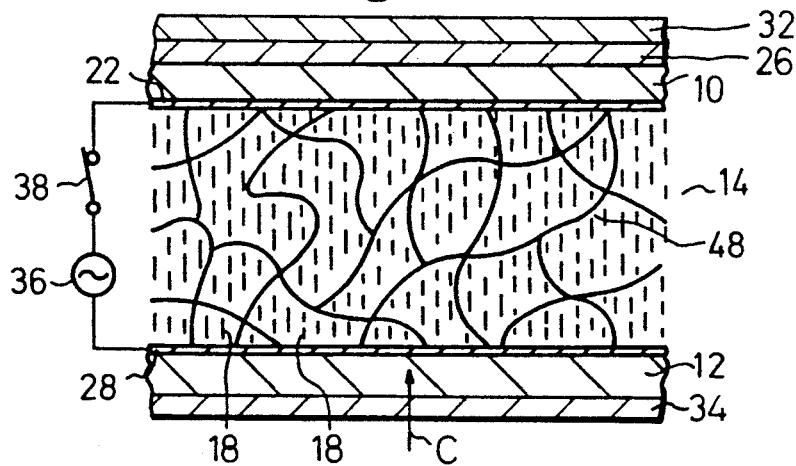
FIG. 16 is cross-sectional view of the liquid crystal display device of FIG. 15, showing when the voltage is applied.

FIG. 15 shows the liquid crystal display device of the type using a macromolecular liquid crystal (liquid crystal polymer), and FIG. 16 shows the device of FIG. 15 when the voltage is applied. The liquid crystal display device includes a liquid crystal panel comprising a first transparent plate 10, a second transparent plate 12 opposed to the first transparent plate 10, a second transparent plate 12 opposed to the first transparent plate 10 with a small gap therebetween, and a liquid crystal layer 14 inserted between the first and second transparent plates 10 and 12. The first and second transparent plates 10 and 12 have transparent electrodes 22 and 28 of ITO, respectively, which are connected to a power source 36 via a switch 38. First and second polarizers 32 and 34 are arranged to have transmitting axes of polarized light in a perpendicular relationship to each other. In addition, a film 26 is arranged between the first transparent plate 10 and the first polarizer 32, the film 26 having anisotropic indices of refraction of a negative uniaxial type.

The liquid crystal layer 14 comprises a mixture of a low-molecular liquid crystal 18 and a macromolecular liquid crystal 48 known as a principal chain type liquid crystal polymer or a side chain type liquid crystal polymer. The low-molecular liquid crystal 18 is oriented along the macromolecular liquid crystal 48 and is randomly distributed as a whole. Therefore, when the voltage is not applied to the liquid crystal 18, an incident light impinges on the molecules of the liquid crystal 18 to scatter, and when the voltage is applied to the liquid crystal 18, the molecules of the liquid crystal 18 uniformly rise relative to the first and second transparent plates 10 and 12. This liquid crystal panel also has a scattering value satisfying the above description.

We claim:

1. A liquid crystal device comprising a first transparent plate (10) having transparent electrode means and an orientation layer, a second transparent plate (12) having transparent electrode means and an orientation layer, a liquid crystal layer (14) inserted between the first and second transparent plates, a first polarizer (32) arranged on the outside of the first transparent plate, and a second polarizer (34) arranged on the outside of the second transparent plate, wherein the liquid crystal layer (14) includes a first liquid crystal (16) existing between the orientation layer of the first transparent plate and the orientation layer of the second transparent plate, and liquid crystal capsules (20) dispersed in the first liquid crystal and including therein a second liquid crystal (18).

2. A liquid crystal device according to claim 1, wherein a film (26) is arranged between one of the first and second transparent plates and one of the associated polarizers, the film having anisotropic indices of refraction of a negative uniaxial type, the first and the second liquid crystal having anisotropic indices of refraction of a positive uniaxial type.

3. A liquid crystal device according to claim 1, wherein the orientation layers of the first and second transparent plates each comprises a perpendicular orientation layer of a type sufficient to cause molecules of the first liquid crystal (16) to be oriented perpendicular to the first and second transparent plates.

4. A liquid crystal device comprising a liquid crystal panel including a first transparent plate (10) having a transparent electrode means, a second transparent plate (12) opposed to the first transparent plate with a small gap therebetween and having a transparent electrode means, and a liquid crystal layer (14) inserted between the first and second transparent plates, and first and second polarizers (32, 34) arranged, respectively, on the outside of the first and second transparent plates;

wherein the liquid crystal layer comprises a liquid crystal of a dispersed type in which molecules of the liquid crystal are randomly distributed when the voltage is not applied to the liquid crystal so that an incident light impinges on the molecules of the liquid crystal to scatter and molecules of the liquid crystal uniformly rise relative to the first and second transparent plates when the voltage is applied to the liquid crystal; and wherein the liquid crystal panel has a scattering value greater than 1 percent, where the scattering value is defined by a percentage of a ratio of an intensity of light transmitted by the liquid crystal panel that is measured by arranging the liquid crystal panel between a source of laser beam and a light detector in such an arrangement that the light detector receives divergent light from the liquid crystal panel within the angular range of approximately six degrees, to that measured by arranging the source of laser beam and the light detector in the same arrangement without a liquid crystal.

5. A liquid crystal device according to claim 4, wherein the scattering value is greater than 3 percents.

6. A liquid crystal device according to claim 5, wherein the scattering value is within the range from 7 percent to 20 percent.

7. A liquid crystal device according to claim 4, wherein the first and second polarizers (32, 34) have transmitting axes of polarized light in a perpendicular relationship to each other.

8. A liquid crystal device according to claim 4, wherein a film (26) is arranged between the liquid crystal panel and the one of the polarizers; the film having anisotropic indices of refraction of a negative uniaxial type; the first and the second liquid crystal having anisotropic indices of refraction of a positive uniaxial type.

9. A liquid crystal device according to claim 4, wherein the liquid crystal layer comprises a polymer dispersed liquid crystal.

* * * * *